United States Patent
Kurple (10) Patent No.: US 10,202,043 B2
(45) Date of Patent: Feb. 12, 2019

(54) STRUCTURE TO OPTIMIZE ELECTRICITY GENERATION IN A VEHICLE

(71) Applicant: Ford Global Technologies, LLC, Dearborn, MI (US)

(72) Inventor: Alexander Charles Kurple, Casco, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 210 days.

(21) Appl. No.: 15/131,565

(22) Filed: Apr. 18, 2016

(65) Prior Publication Data
US 2017/0297436 A1 Oct. 19, 2017

(51) Int. Cl.
| | |
|---|---|
| B60L 1/00 | (2006.01) |
| B60L 3/00 | (2006.01) |
| H02G 3/00 | (2006.01) |
| B60L 11/02 | (2006.01) |
| B60L 11/18 | (2006.01) |
| H02M 3/04 | (2006.01) |
| H02J 7/14 | (2006.01) |
| B60L 1/02 | (2006.01) |
| B60L 11/00 | (2006.01) |
| B60L 11/12 | (2006.01) |

(52) U.S. Cl.
CPC ............ B60L 11/02 (2013.01); B60L 1/00 (2013.01); B60L 1/02 (2013.01); B60L 11/005 (2013.01); B60L 11/12 (2013.01); B60L 11/1811 (2013.01); B60L 11/1861 (2013.01); B60L 11/1868 (2013.01); H02J 7/14 (2013.01); H02J 7/1453 (2013.01); H02M 3/04 (2013.01); B60L 2240/36 (2013.01)

(58) Field of Classification Search
USPC .................................... 307/9.1, 10.1
See application file for complete search history.

(56) References Cited

U.S. PATENT DOCUMENTS

| | | | |
|---|---|---|---|
| 5,166,584 A | 11/1992 | Fukino et al. | |
| 6,384,489 B1* | 5/2002 | Bluemel | H02J 1/08 307/10.1 |
| 6,664,751 B1* | 12/2003 | Gabriel | B60K 6/445 180/65.235 |
| 6,717,288 B2* | 4/2004 | Besnier | H02M 3/33561 307/10.1 |
| 7,080,265 B2 | 7/2006 | Thaker et al. | |

(Continued)

FOREIGN PATENT DOCUMENTS

| | | |
|---|---|---|
| EP | 2365603 A2 | 8/2009 |
| JP | 09037459 A * | 2/1997 |

OTHER PUBLICATIONS

Search Report dated Oct. 17, 2017, for GB Patent Application No. GB1706085.6 (3 pages).

*Primary Examiner* — Adam Houston
(74) *Attorney, Agent, or Firm* — James P. Muraff; Neal, Gerber & Eisenberg LLP (57) ABSTRACT

Various embodiments of the present disclosure provide system for optimizing electricity generation in a vehicle by managing temperature in vehicle engine and various components to increase efficiency of the engine and various components. In one embodiment, the electricity management system includes a generator connected to a high-power storage device, such as a battery or a capacitor, and a DC-DC converter which includes multiple voltage set-points.

15 Claims, 3 Drawing Sheets

(56) References Cited

U.S. PATENT DOCUMENTS

| | | | |
|---|---|---|---|
| 7,819,172 B2 | 10/2010 | Otsuka et al. | |
| 8,115,334 B2 * | 2/2012 | Vyas | B60K 6/46 307/10.1 |
| 8,276,559 B2 | 10/2012 | Holz et al. | |
| 8,796,881 B2 * | 8/2014 | Davis | B60L 11/1842 307/69 |
| 8,829,722 B2 * | 9/2014 | Kusch | H02J 7/1423 307/10.4 |
| 8,912,682 B2 * | 12/2014 | Rozman | H02J 1/14 307/11 |
| 8,994,208 B2 * | 3/2015 | Huang | B60L 3/0092 307/9.1 |
| 9,960,461 B2 * | 5/2018 | King | B60L 3/0046 |
| 2003/0118891 A1 * | 6/2003 | Saito | B60L 1/003 429/62 |
| 2007/0103002 A1 * | 5/2007 | Chiao | B60K 6/46 307/10.1 |
| 2007/0179636 A1 * | 8/2007 | Shige | B60L 11/1861 700/22 |
| 2008/0072859 A1 * | 3/2008 | Esaka | H02J 7/0019 123/179.3 |
| 2009/0015193 A1 * | 1/2009 | Esaka | B60K 6/28 320/103 |
| 2009/0309416 A1 * | 12/2009 | Bose | B60K 6/32 307/9.1 |
| 2010/0001523 A1 * | 1/2010 | Sato | B60K 6/48 290/31 |
| 2010/0043757 A1 * | 2/2010 | Bolz | F02D 41/20 123/476 |
| 2010/0050671 A1 * | 3/2010 | Kahn | B60H 1/00378 62/190 |
| 2010/0236502 A1 * | 9/2010 | Watanabe | B60K 6/48 123/41.02 |
| 2012/0223575 A1 * | 9/2012 | Hachiya | B60L 1/003 307/9.1 |
| 2013/0169210 A1 | 7/2013 | Louch et al. | |
| 2013/0175022 A1 * | 7/2013 | King | B60H 1/00392 165/202 |
| 2014/0060086 A1 * | 3/2014 | Ranalli | B60H 1/00478 62/3.3 |
| 2014/0184153 A1 | 7/2014 | Saint-Leger et al. | |
| 2015/0037648 A1 * | 2/2015 | Nguyen | H01M 10/625 429/120 |
| 2015/0258947 A1 * | 9/2015 | Harkins | B60L 1/003 307/10.1 |
| 2015/0349692 A1 * | 12/2015 | Shibata | F25B 27/00 318/479 |
| 2015/0353035 A1 | 12/2015 | Ferrel et al. | |
| 2015/0360579 A1 * | 12/2015 | Hashimoto | B60L 11/1868 307/10.1 |
| 2016/0031330 A1 * | 2/2016 | Ishigaki | B60L 11/182 307/10.1 |
| 2016/0141671 A1 * | 5/2016 | Ogawa | H01M 8/04179 429/414 |
| 2016/0164285 A1 * | 6/2016 | Elliott | B60L 11/1887 307/9.1 |
| 2016/0272076 A1 * | 9/2016 | Fan | B60L 11/1816 |
| 2016/0297309 A1 * | 10/2016 | Kim | B60L 11/1811 |
| 2017/0016419 A1 * | 1/2017 | Siekkinen | G01R 31/3606 |
| 2017/0088002 A1 * | 3/2017 | Deshpande | B60L 11/1861 |
| 2017/0129493 A1 * | 5/2017 | Yamazaki | B60K 6/365 |
| 2017/0151885 A1 * | 6/2017 | Kim | B60L 11/1861 |
| 2017/0197628 A1 * | 7/2017 | Nefcy | B60K 6/36 |
| 2017/0234285 A1 * | 8/2017 | Huh | B60K 6/26 123/179.4 |
| 2017/0253142 A1 * | 9/2017 | Buckhout | B60L 11/1875 |
| 2017/0259803 A1 * | 9/2017 | Khafagy | B60W 20/13 |
| 2017/0259808 A1 * | 9/2017 | Makled | B60K 6/48 |
| 2017/0264104 A1 * | 9/2017 | Horitake | H02J 7/1423 |
| 2017/0297436 A1 * | 10/2017 | Kurple | B60L 11/02 |
| 2017/0310142 A1 * | 10/2017 | Watanabe | H02J 7/0054 |
| 2017/0328329 A1 * | 11/2017 | Buchanan | F02N 11/0866 |
| 2018/0001746 A1 * | 1/2018 | Vehr | B60H 1/005 |
| 2018/0159438 A1 * | 6/2018 | Leadingham | H02M 7/217 |

* cited by examiner

STRUCTURE TO OPTIMIZE ELECTRICITY GENERATION IN A VEHICLE

TECHNICAL FIELD

The present disclosure generally relates to a system and method for optimizing the electricity generation in a vehicle by utilizing a unique electrical structure with increased number of voltage set points that monitors and manages the temperature of the vehicle engine and other vehicle components to increase their efficiency.

BACKGROUND

The electricity generation in vehicles is constrained by the temperature limits of various components such as the alternator and battery. These constraints lower the efficiency of the components and reduce efficiency in electricity generation and distribution. For example, the efficiency of the engine decreases while it warms up in the vehicle.

Accordingly, there is a continuing need for new and improved systems for managing the temperature of the engine and the various components to optimize electricity generation of a vehicle.

SUMMARY

The appended claims define this application. The Specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application Various embodiments of the present disclosure provide system for optimizing electricity generation in a vehicle by utilizing a unique electrical structure with increased number of voltage set points that monitors and manages the temperature of the vehicle engine and other vehicle components to increase their efficiency. In one embodiment, the electricity management system includes a generator connected to a high-power storage device, such as a battery or a capacitor, and a DC-DC converter which includes multiple voltage set-points. The voltage set-points are used to connect multiple loads requiring different voltage values. A high energy storage device is also connected to the converter for providing energy to the various loads. These multiple voltage set points enable efficient distribution of power and provide optimal voltage for each component.

In certain embodiments, the DC-DC converter further includes a temperature control module for monitoring and controlling the temperature of various components of the vehicle. The control unit is in communication with the vehicle heating and cooling system and is able to provide heat and/or cooling to any components as needed to maintain an optimal temperature for efficient electricity management.

Such a configuration provides an optimized electricity generation system for the vehicle.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

While the electricity optimization system of the present disclosure may be embodied in various forms, the Figures show and this Specification describes some exemplary and non-limiting embodiments of the electricity optimization system. The present disclosure is an exemplification of the electricity optimization system and does not limit the electricity optimization system to the specific illustrated and described embodiments. Not all of the depicted or described components may be required, and some embodiments may include additional, different, or fewer components. The arrangement and type of the components may vary without departing from the spirit or scope of the claims set forth herein.

Existing electrical systems of vehicles utilize various step-up or step-down mechanisms to manage and adjust the voltage provided for each vehicular component. Such mechanisms are inefficient, and such a system results is wasted electricity. Rather than sending the same amount of power for each component and then adjusting the voltage individually at each component, various embodiments of the present disclosure provide an efficient system for providing the optimal voltage to each vehicle component thereby optimizing the electricity generation and utilization.

More specifically, various embodiments of the present disclosure provide a system and method for optimizing electricity generation by utilizing multiple voltage set points to operate vehicle components at the optimum voltage level based on their loads and to set monitor and regulate the temperature for operation of each component.

By providing multiple voltage set points for each vehicle component at the DC-DC converter, the electricity optimization system of the present disclosure provides the optimal voltage for each component without the use of any step-up or step-down mechanisms. The DC-DC converter is a more efficient source for controlling the power output for each component. The DC-DC converter can send the optimal voltage directly to each component through the voltage set points. Furthermore, because all of the power is being output to the various components through the DC-DC converter, the DC-DC converter may be configured to determine the optimal power output for the generator. More specifically, rather than the generator being configured to output a default voltage and current, the DC-DC converter may determine that for a certain system the optimal output may be higher or lower, so that the power can be more efficiently output to each of the components. Such a configuration enables the electricity optimization system to efficiently power the various components of the vehicle.

In one embodiment, the electricity optimization system and method includes increasing the number of voltage set points in the vehicle to maximize efficiency of power usage. The voltage set points provide an optimized voltage level at which the connected component should operate. Increasing the number of voltage set points in the vehicle provides optimized voltage level for a plurality of components and enables the electricity management system to distribute power so as to operate each component in the most power efficient manner.

Figure 1A:
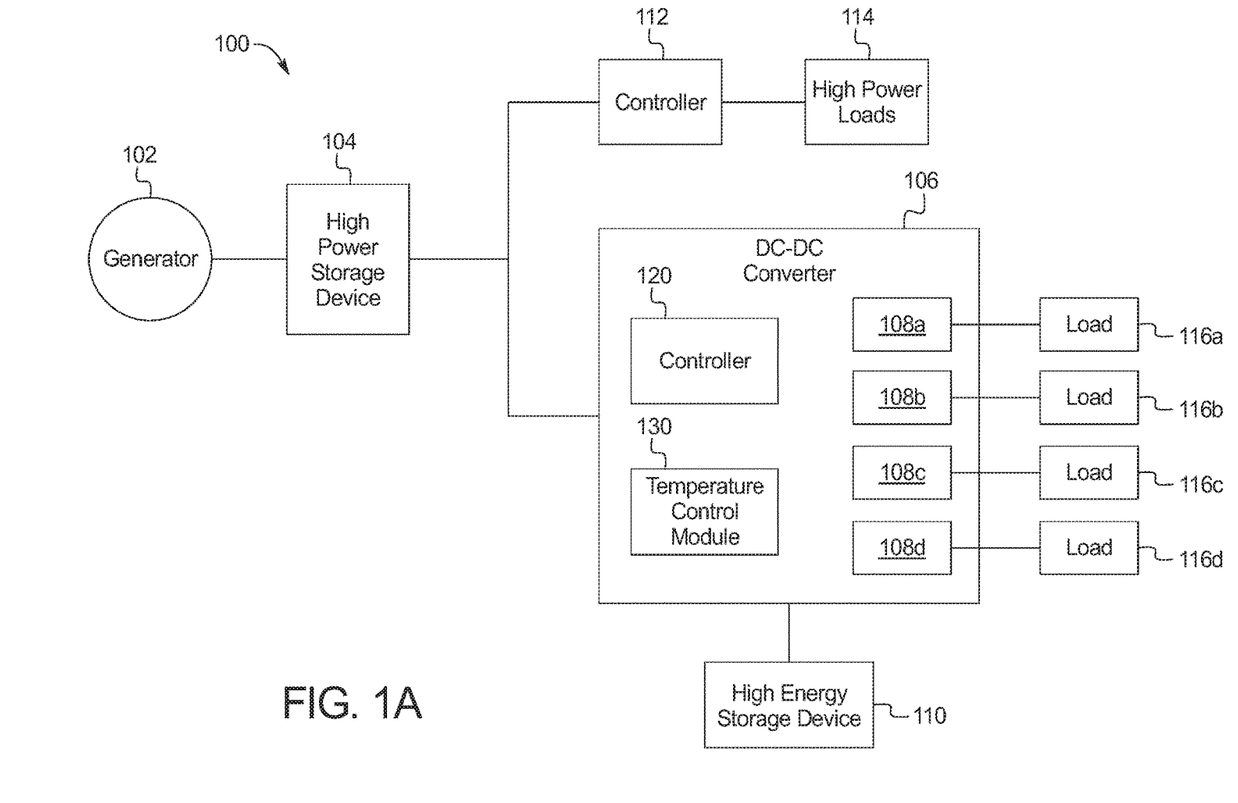
FIG. 1A illustrates a block diagram including components of one embodiment of the electricity optimization system of the present disclosure.

As illustrated in FIG. 1, in this embodiment, the electricity optimization system 100 includes a generator 102, a high power storage device 104, a DC-DC converter 106 with multiple voltage set points 108a, 108b, 108c, 108d, and a high energy storage device 110.

The generator 102 produces power for various loads within the vehicle. A load refers to a system or a component within the vehicle that draws current. A vehicle includes various high power loads 114, and lower power loads 116. In certain embodiments, this generator 102 may be an alternator, or a solar panel, or another machine that produces electricity. In certain embodiments, the generator may also operate in reverse as a motor to start the engine or move the vehicle. In this example embodiment, a standard 12 volt electrical structure of the vehicle is replaced with a generator 102 operating at 19 volts. The generator 102 is connected to high power storage device 104.

The high power storage device 104 receives and stores the voltage output of the generator and regulates the output voltage from the generator 102 so as to removes any transients in the generation of the vehicle. In certain embodiments, this high power storage device 104 is a battery. In certain embodiments, the high power storage device 104 is a capacitor. In certain embodiments, the high power storage device 104 is capable of receiving up to 20 volts. In this example embodiment, the high power storage device 104 is connected to various controllers 112 that connect the high power loads 114 of the vehicle to the high power storage device 104. Through these controllers 112, the high power storage device 104 provides high voltage power to the high power loads 114. For example, high power loads 114, such as electrical compressors, electrical heaters, power steering systems and electrical pumps require high power outputs from the high power storage device 104.

The high power storage device 104 may also be used to power various components within the vehicle that do not require high power. More specifically, in this example embodiment, the high power storage device 104 is also connected to a DC-DC converter 106. A DC-DC converter 106 may be used for converting a high voltage from a high voltage power source 104 to a low voltage for other vehicle components, such as the lower power loads 116. In this example embodiment, the voltage from the high power storage device 104 is distributed to the lower power loads 116 for such vehicle components via a DC-DC converter 106.

In this example embodiment, the DC-DC converter includes multiple voltage set points 108a, 108b, 108c, 108d in the vehicle. By increasing the number of voltage set points 108a, 108b, 108c, 108d in a vehicle, the electricity optimization system 100 optimizes the distribution of power to these lower power components 116. More specifically, the DC-DC converter 106 is connected to various load 116 in the vehicle and the DC-DC converter 106 includes various voltage set points 108 for each component. Each voltage set point 108 is set at the optimal voltage for the component.

Figure 1B:
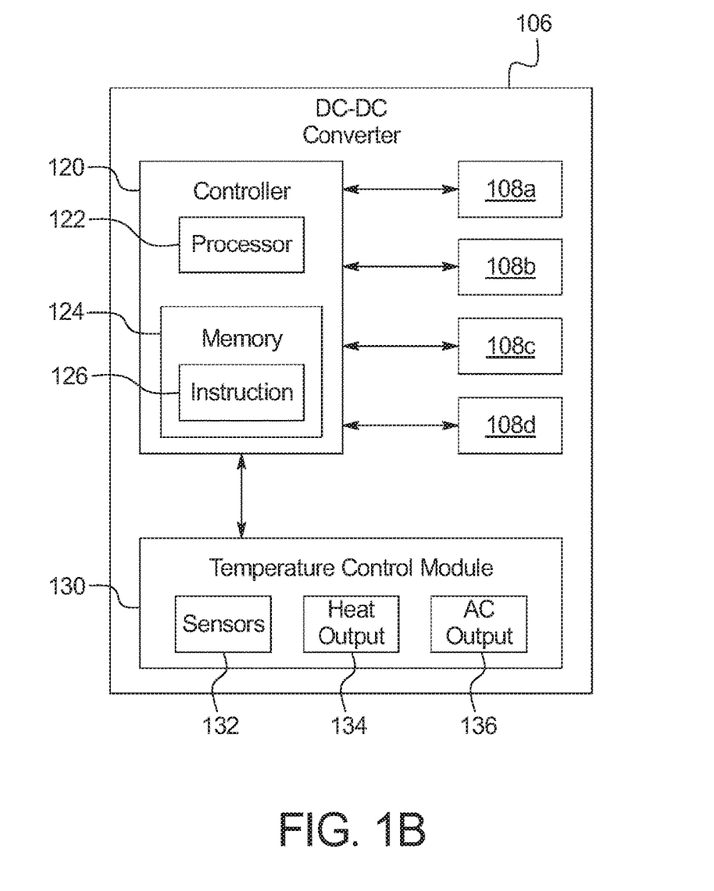
FIG. 1B illustrates a block diagram including components of a DC-DC converter of one embodiment of the electricity optimization system of the present disclosure.

The DC-DC converter 106 includes a controller 120 to power the individual loads at the most efficient voltage in the vehicle. More specifically, FIG. 1B illustrates an expanded block diagram of the DC-DC converter 106. As illustrated in FIG. 1B, the DC-DC converter 106 includes a controller 120 including at least one processor 122 in communication with a main memory 124 that stores a set of instructions 126. The processor 122 is configured to communicate with the main memory 124, access the set of instructions 126, and execute the set of instructions 126 to cause the DC-DC converter to perform any of the methods, processes, and features described herein.

The processor 122 may be any suitable processing device or set of processing devices such as, but not limited to: a microprocessor, a microcontroller-based platform, a suitable integrated circuit, or one or more application-specific integrated circuits (ASICs). The main memory 124 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); or read-only memory.

In one embodiment, the processor 122 is configured to communicate with the memory 124, access the set of instructions 126, and execute the set of instructions 126 to cause the DC-DC converter to determine and power the individual loads at the most efficient voltage. In this embodiment, the memory 124 stores information regarding the optimal voltage for various components of the vehicle, and the memory 124 stores instructions 126 for controlling the power to each of the components to maximize efficiency and optimize power distribution.

As described above, the DC-DC converter 106 of the electricity optimization system 100 includes a plurality of voltage set points that power individual loads of the vehicle. In this embodiment, the DC-DC converter 106 receives commands from a vehicle control system (such as the vehicle control system 200 described in connection with FIG. 2 below) to power various components within the vehicle. The controller 120 of the DC-DC converter registers the commands from the vehicle control system and the controller 120 provides power at the optimal voltage level to the appropriate vehicular system and/or component.

Turning back to FIG. 1, the DC-DC converter 106 is also connected to the high energy storage device 110 of the vehicle. The high energy source 110 may be a capacitor or a battery in the vehicle. Thus, the DC-DC converter may draw power from both.

The DC-DC converter 106 also recharges the high power storage device when necessary for the operation. More specifically, in certain embodiments, the high power storage device 104 and the high energy storage device 110 are configured to charge and/or discharge one another. Both the high power storage device 104 and the high energy storage device may be capacitors or batteries, which are configured to charge up, store power, discharge power, etc. However, in certain embodiments, the high power storage device 104 is a more expensive, often larger device, than the high energy storage device 110. The high power storage device 104 is not intended to hold and maintain a charge because that would be expensive and wasteful. As such, in certain embodiments, it is more cost effective and efficient, for the high power storage device 104 to take power from the high energy storage 110 to recharge the high power storage device 104 at a minimum operating load.

For example, when starting the vehicle, the engine draws power from the high power storage device 104. In this example, rather than having the high power storage device 104 sit fully charged prior to the vehicle being started, the high energy storage device 110 charges the high power storage device 104 to provide the power needed for starting the vehicle. For example, existing diesel truck starting systems include two lead acid batteries to provide sufficient power to start the truck. One of the batteries is utilized to charge the other battery to ensure that there is sufficient power to start the truck. After starting, this second battery is not utilized for any other purpose. Instead of using two batteries to start the truck, the electricity optimization system 100 provides the high energy storage device 110, which charges the high power storage device 104 with sufficient power to start the truck. In this example, after starting the vehicle, the high power storage device 104 continues to power other high power loads.

In certain alternative embodiments, instead of the high energy storage device 110 charging the high power storage device 104, the electricity optimization system 100 operates in reverse. More specifically, in certain embodiments, the high power storage device 104 charges the high energy storage device for certain operations. One example is for regenerative braking. In this example, as the vehicle is slowing down, the vehicle should capture as much energy as possible. In this example embodiment, the high power storage device 104 would capture as much energy as possible and then discharge the excess into the high energy storage device 110 so that the high power storage device 104 may continue to charge and manage the load from the brake system.

In certain embodiments, the high power storage device 104 may be a large capacitor, or a battery such as a lithium ion battery a lead acid battery that is modified with thinner plates designed for its specific use. In certain embodiments, the high energy storage device 110 may be a smaller capacitor, or a battery such as a lead acid battery or a lithium ion battery modified with thicker plates optimized for the energy storage device. Such a configuration provides a more efficient distribution of power and management of electricity.

In various embodiments of the present disclosure, the DC-DC converter 106 of the electricity optimization system 100 also optimizes the electricity generation of a vehicle by monitoring and managing the temperature of each of the components affected by the temperature in their operation. More specifically, in this embodiment, the electricity generation optimization system 100 is further configured to manage the temperature of the components within a vehicle by controlling a heater (not shown) and air-conditioner (not shown) of the vehicle. In this embodiment, the DC-DC converter 106 includes a temperature control module 130.

As illustrated in FIG. 1B, the temperature control module 130 is in communication with the controller 120 of the DC-DC converter 106. In this embodiment, the DC-DC converter 106 includes a controller 120 configured to turn on heaters and vents to control the temperature inside the vehicle, batteries within the vehicle, capacitors, the engine, and other components to improve operation of the vehicle by managing the temperature of the component. More specifically, the temperature control module 130 includes one or more sensors 132 for monitoring the temperature of various components in the vehicle. The temperature control module 130 further includes a heat output 134 and an AC output 136.

In this embodiment, the electricity optimization system 100 utilizes the sensors 132 to detect the temperature of various components within the vehicle and register the temperature information with the controller 120. In certain embodiments, the controller 120 causes the processor 122 to execute the plurality of instructions 126 in the memory 124 to reduce the temperature of the components within a vehicle by controlling air-conditioner (not shown) of the vehicle. In certain embodiments, the controller 120 causes the processor 122 to execute the plurality of instructions 126 in the memory 124 to warm up the temperature of certain components within the vehicle by controlling a heater (not shown) of the vehicle.

In another embodiment, the DC-DC converter 106 distributes power from the high power storage device 104 and the high energy device 110 to manage the temperature of the various vehicular components. More specifically, in one embodiment, the DC-DC converter 106 controller 120 causes the processor 122 to execute a plurality of instructions 126 stored in the memory 124 to calculate the energy available in the high power storage device 104 and the high energy storage device 110. In this embodiment, the DC-DC converter may determine, at the end of each cycle, the required power to charge the high power storage device for the next cycle. The DC-DC converter 106 takes the calculation of the available energy from the two sources and uses part of the energy to start the engine and sends the other energy to warm the vehicle, battery, or engine to improve the performance of the vehicle. The heat from the DC-DC converter 106 and the generator 102 can be sent to the rest of the vehicle to cool the components in the DC-DC converter 106 and improve the operation.

Accordingly, though such a configuration, the electricity optimization system is redistributing the heat produced while charging and/or starting the system to various vehicular components to increase their performance.

It should be appreciated that in certain embodiments, the system may be set to include other energy generators including hydraulic pumps, air compressors, water pumps, or the systems generating energy and storing it to power loads in the vehicle or building. More specifically, the embodiments described above related to management of electrical energy produced by the generator. In certain alternative embodiments, a similar system including a high cost high power storage device and a low cost high energy storage device and a converter may be utilized to manage and optimize other types of generation. In certain embodiments, the generator may also work as a motor to propel the vehicle if needed.

It should be appreciated that the electricity optimization system of the present disclosure may also be utilized for electricity management within other devices not related to a vehicle, and/or with building electricity management.

Figure 2:
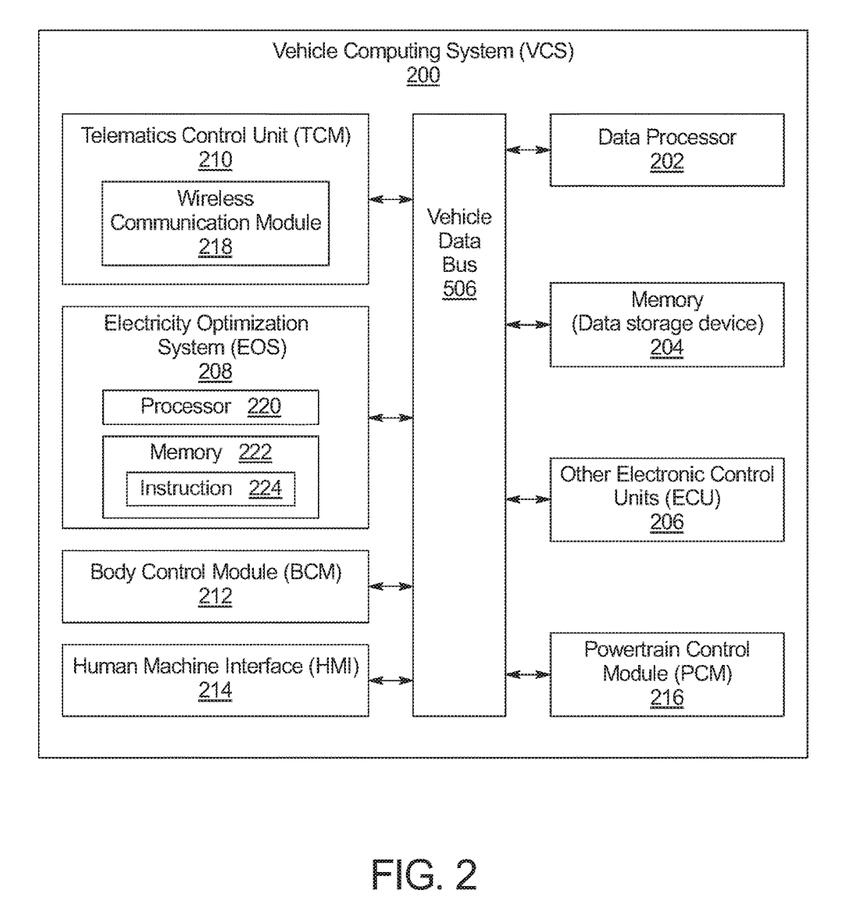
FIG. 2 illustrates a block diagram including components of one embodiment of a vehicle control system including the electricity optimization system of the present disclosure.

FIG. 2 illustrates one example embodiment of a vehicle control system (VCS) 200 for operating the electricity optimization system 208 of the present disclosure. The VCS 200 includes various electronic control units (ECUs) that are responsible for monitoring and controlling the electrical systems or subsystems of the vehicle, as described in more detail below. Each ECU includes various components that are require electrical power in order to operate. This example embodiment of a VCS 200 includes one example embodiment of the Electricity Optimization System (EOS) 208 of the present disclosure. Other embodiments of the EOS 208 may include different, fewer, or additional components than those described below and shown in FIG. 2.

As shown in FIG. 2, the VCS 200 can include a data processor 202 in communication with and a memory 204 (also referred to herein as a data storage device) and a vehicle data bus 206. The memory 204 stores a set of instructions. The processor 202 is configured to communicate with the memory 204, access the set of instructions, and execute the set of instructions to cause the electricity optimization system to perform any of the methods, processes, and features described herein.

The processor 202 may be any suitable processing device or set of processing devices such as, but not limited to: a microprocessor, a microcontroller-based platform, a suitable integrated circuit, or one or more application-specific integrated circuits (ASICs). The memory 204 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); or read-only memory.

In embodiments, the VCS 200 can comprise a general purpose computer that is programmed with various programming instructions or modules stored in the data storage device 204 (e.g., electronic memory), or elsewhere. The VCS 200 further includes various electronic control units (ECUs) that are responsible for monitoring and controlling the electrical systems or subsystems of the vehicle. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 200 include an electricity optimization system (EOS) 208, a telematics control unit (TCM) 210, a body control module (BCM) 212, a human-machine interface (HMI) 214, a power train control module (PCM) 216, and various other ECUs 206.

The ECUs of the VCS 200 can be interconnected by the vehicle bus 206 (such as, e.g., a controller area network (CAN) bus), which passes data to and from the various ECUs, as well as other vehicle and/or auxiliary components in communication with the VCS 200. Further, the data processor 202 can communicate with any one of the ECUs and the data storage device 204 via the data bus 206 in order to carry out one or more functions, including the functions associated with methods described herein.

In this example embodiment, the electricity optimization system (EOS) 208 is an ECU configured to for controlling and monitoring electrical power distributed to various components of the vehicle, and for monitoring and controlling the temperature of the various components of the vehicle. One example embodiment of the EOS 208, is the system 100 described in connection with FIG. 1. In this example embodiment, the EOS 208 includes a processor 220 in communication with a memory 222 storing a plurality of instructions 224, similar to the processor 202 and memory 204 of the vehicle control system 200 as described above. This processor 220 and memory 204 may be included within a DC-DC converter such as the DC-DC converter 106 of the EOS system 100 in connection with FIG. 1, which includes a processor 122 and memory 124.

In some embodiments, the EOS 208 is a separate, stand-alone ECU that is interconnected to the BCM 212, PCM 216, TCU 210, and other ECUs of the vehicle via the vehicle bus 206 in order to carry out the electricity optimization operations. More specifically, the EOS 208 converts a source of direct current (DC) from one voltage level to a lower voltage level and distributes power to various components in the VCS 200. For example, the EOS 208 may receive commands from the VCS processor 202 to provide power for a certain component. The EOS 208 processes the commands to identify the appropriate ECU for carrying out the command, and provides the appropriate level of power to the appropriate component of the appropriate ECU. In other embodiments, the EOS 208 may be comprised of multiple segments that are incorporated into various ECUs of the VCS 200, such as, for example, the BCM 212, the PCM 216, and/or the TCU 210, to process the EOS commands (such as to power certain components received at each ECU. In still other embodiments, the EOS 208 may be included within one ECU, such as, e.g., the TCU 210, in order to power components of the TCU 210.

The body control module (BCM) 212 is an ECU for controlling and monitoring various electronic accessories in a body of the vehicle. In embodiments, the BCM 212 is an ECU that controls the doors of the vehicle including locking, unlocking, opening, and/or closing said doors. In some embodiments, the BCM 212 also controls the power windows, power roof (e.g., moon roof, sunroof, convertible top, etc.), and interior lighting of the vehicle. The BCM 212 may also control other electronically-powered components in the body of the vehicle, such as, for example, air-conditioning units, power mirrors, and power seats. In cases where the BCM 212 only controls and monitors the doors of the vehicle, the BCM 212 may be referred to as the door control unit (DCU), as will be appreciated. The BCM 212 can be configured to implement commands received from the FSO 208 that are related to the doors, windows, or other body components controlled by the BCM 212.

The power train control module (PCM) 216 is an ECU for controlling and monitoring the engine and transmission of the vehicle. In some embodiments, the PCM 216 can be separated into two separate ECUs, specifically an engine control unit and a transmission control unit. In either case, the PCM 216 can be configured to control starting and stopping of the engine of the vehicle, and may implement commands to start the engine received from the FSO 208.

The telematics control unit (TCU) 210 is an ECU for enabling the vehicle to connect to various wireless networks, including, for example, ASDA, GPS, WiFi, cellular, Bluetooth, NFC, RFID, satellite, and/or infrared. In embodiments, the TCU 210 (also referred to as a "vehicle telematics unit") includes a wireless communication module 218 comprising one or more antennas, radios, modems, receivers, and/or transmitters (not shown) for connecting to the various wireless networks. For example, the wireless communication module 218 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 210 can also be configured to control tracking of the vehicle using latitude and longitude values obtained from a GPS satellite. In a preferred embodiment, the wireless communication module 218 includes a Bluetooth or other short-range receiver (not shown) for receiving vehicle commands and/or data transmitted by the FSO 208, and a Bluetooth or other short-range transmitter (not shown) for sending data to the FSO 208.

In embodiments, the TCU 210 receives external data via the wireless communication module 218 and provides the external data to an appropriate ECU of the VCS 200. For example, if the TCU 210 receives turn off exterior lights command from an operator, the TCU 210 sends the command to the BCM 212 via the vehicle bus 206. Likewise, if the TCU 210 receives a start engine command, the TCU 210 sends the command to the PCM 216 via the vehicle bus 206. In some embodiments, the TCU 210 also receives internal data from other ECUs of the VCS 200 and/or the data processor 202, with instructions to transmit the internal data to the vehicle, or another component of the remote RKS characterization system of the present disclosure.

The human-machine interface (HMI) 214 (also referred to as a "operator interface") can be an ECU for enabling operator interaction with the vehicle and for presenting vehicle information to the vehicle operator or driver. Though not shown, the HMI 214 can comprise an instrument panel (IP), a media display screen, as well as one or more input devices and/or output devices for inputting, entering, receiving, capturing, displaying, or outputting data associated with the vehicle control system 200, the method 100 shown in FIG. 1 or the techniques disclosed herein. The HMI 214 can be configured to interact with the other ECUs of the VCS 200 and/or the data processor 202 via the data bus 206 in order to provide information or inputs received via the HMI 214 to an appropriate component of the VCS 200 and to present, to the vehicle operator or driver, information or outputs received from the various components of the VCS 200.

Any process descriptions or blocks in the figures, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle electricity optimization system comprising:
a DC-to-DC converter configured to:
draw power from a high energy storage device and a high power storage in communication with various controllers, which are in communication with various high power loads;
distribute the power to vehicle components through voltage set points, each of the voltage set points set at an optimal operating voltage of each of the vehicle components; and
monitor temperatures of the vehicle components.

2. A vehicle electricity optimization system comprising:
a DC-to-DC converter configured to:
draw power from a high power storage device and a high energy storage device;
distribute the power to a plurality of vehicle components through a plurality of voltage set points, each of the voltage set points set at an optimal operating voltage of each of the plurality of vehicle components; and
monitor temperatures of the plurality of vehicle components; and
a generator configured to output power to the high power storage device, wherein the generator includes one of a group consisting of: (a) an alternator, (b) a solar panel, (c) a hydraulic pump, (d) an air compressor, and (e) a water pump.

3. The vehicle electricity optimization system of claim 1, wherein the DC-to-DC converter is configured to convert output power from the high power storage device to lower power for the vehicle components.

4. The vehicle electricity optimization system of claim 1, wherein the DC-to-DC converter is further configured to distribute the power drawn from the high power storage device and the high energy storage device to start a vehicle engine and manage at least one of the temperatures.

5. A vehicle electricity optimization system comprising:
a DC-to-DC converter configured to:
draw power from a high power storage device and a high energy storage device; and
distribute the power to a plurality of vehicle components through a plurality of voltage set points, each of the voltage set points set at an optimal operating voltage of each of the plurality of vehicle components,
wherein the DC-to-DC converter includes a temperature module configured to monitor temperatures of the plurality of vehicle components, and
wherein the temperature module is in communication with a vehicle cooling and heating system and the temperature module is configured to use the vehicle cooling and heating system to manage at least one of the temperatures.

6. The vehicle electricity optimization system of claim 1, wherein the high power storage device is one of a group consisting of: (a) a battery, and (b) a capacitor.

7. The vehicle electricity optimization system of claim 1, wherein the high energy storage device is one of a group consisting of: (a) a battery, and (b) a capacitor.

8. A vehicle electricity optimization system comprising:
a DC-to-DC converter configured to:
draw power from a high power storage device and a high energy storage device, wherein the high power storage device is in communication with various controllers, which are in communication with various high power loads;
distribute the power to a plurality of vehicle components through a plurality of voltage set points, each of the voltage set points set at an optimal operating voltage of each of the plurality of vehicle components;
monitor temperatures of the plurality of vehicle components; and
manage the temperatures based on the monitored temperatures.

9. A vehicle electricity optimization system comprising:
a DC-to-DC converter configured to:
draw power from a high power storage device and a high energy storage device;
distribute the power to a plurality of vehicle components through a plurality of voltage set points, each of the voltage set points set at an optimal operating voltage of each of the plurality of vehicle components;
monitor temperatures of the plurality of vehicle components; and
manage the temperatures based on the monitored temperatures; and
a generator configured to output power to the high power storage device,
wherein the generator includes one or more of a group consisting of: (a) an alternator, (b) a solar panel, (c) a hydraulic pump, (d) an air compressor, and (e) a water pump.

10. The vehicle electricity optimization system of claim 8, wherein the DC-to-DC converter is configured to convert output power from the high power storage device to lower power for the plurality of vehicle components.

11. The vehicle electricity optimization system of claim 8, wherein the DC-to-DC converter is further configured to distribute the power drawn from the high power storage device and the high energy storage device to start a vehicle engine.

12. The vehicle electricity optimization system of claim 8, wherein the DC-to-DC converter further includes a temperature module configured to the temperatures.

13. The vehicle electricity optimization system of claim 12, wherein the temperature module is in communication with a vehicle cooling and heating system and the temperature module is further configured to use the vehicle cooling and heating system to manage at least one of the temperatures.

14. The vehicle electricity optimization system of claim 8, wherein the high power storage device is one of a group consisting of: (a) a battery, and (b) a capacitor.

15. The vehicle electricity optimization system of claim 8, wherein the high energy storage device is one of a group consisting of: (a) a battery, and (b) a capacitor.

* * * * *